United States Patent [19]

Lane, Jr.

[11] 4,068,479

[45] Jan. 17, 1978

[54] FLOAT TETHER TERMINATOR

[76] Inventor: Noel W. Lane, Jr., 2106 Windmill View Road, El Cajon, Calif. 92020

[21] Appl. No.: 645,785

[22] Filed: Dec. 31, 1975

[51] Int. Cl.² .......................... E02B 3/04; F16G 11/00
[52] U.S. Cl. ...................................... 61/5; 24/129 R; 114/220; 289/1.5; 403/220
[58] Field of Search .............. 24/129 D, 129 R, 115 J, 24/115 K; 61/1 F, 5; 248/60, 54 R; 174/42; 267/74, 141; 9/8 R; 211/119.01, 119.02, 119.1; 403/220; 289/1.5

[56] References Cited

U.S. PATENT DOCUMENTS

| 1,473,362 | 11/1923 | Tilton | 248/56 |
|---|---|---|---|
| 1,960,171 | 5/1934 | Seeger | 24/129 R |
| 2,267,431 | 12/1941 | Steensen | 248/60 |
| 2,273,869 | 2/1942 | Julien | 248/358 |
| 2,381,394 | 8/1945 | Beach | 9/8 R |
| 3,549,143 | 12/1970 | Gilliam | 267/74 |
| 3,553,345 | 1/1971 | Edwards | 174/42 |
| 3,651,647 | 3/1972 | Flaviani | 61/1 F |
| 3,673,804 | 7/1972 | Washburn | 61/1 F |
| 3,717,907 | 2/1973 | Klein | 24/129 R |
| 3,806,627 | 4/1974 | Harmon | 174/42 |
| 3,817,507 | 6/1974 | Derman | 267/74 |
| 3,846,033 | 11/1974 | Smollinger | 174/42 |
| 3,857,645 | 12/1974 | Klein | 24/129 R |
| 3,898,760 | 8/1975 | Klein | 24/128 R |

FOREIGN PATENT DOCUMENTS

| 736,380 | 6/1966 | Canada | 267/141 |

Primary Examiner—Bernard A. Gelak
Attorney, Agent, or Firm—Herbert E. Kidder

[57] ABSTRACT

A flexible terminator used as a terminal connector between the ends of a tether line and the ballast or a float for the construction of a tethered breakwater unit. One end of the terminator has a unique configuration which receives the end of the tether line in such a manner that the tether line is locked into attachment to the terminator without the use of a conventional knot arrangement. The terminator has a flexible central neck portion which receives the flexion between the floats and the ballast due to the wave motion in the water, eliminating the significant fatigue and normal fiber abrasion experienced by the tether line when tied to the ballast by a typical knot. The tether line is in axial alignment with the central neck portion of the terminator, so that the pendulum action at the attachment points between the tether line and the float and the ballast are transferred to the central portion of the terminator.

3 Claims, 9 Drawing Figures

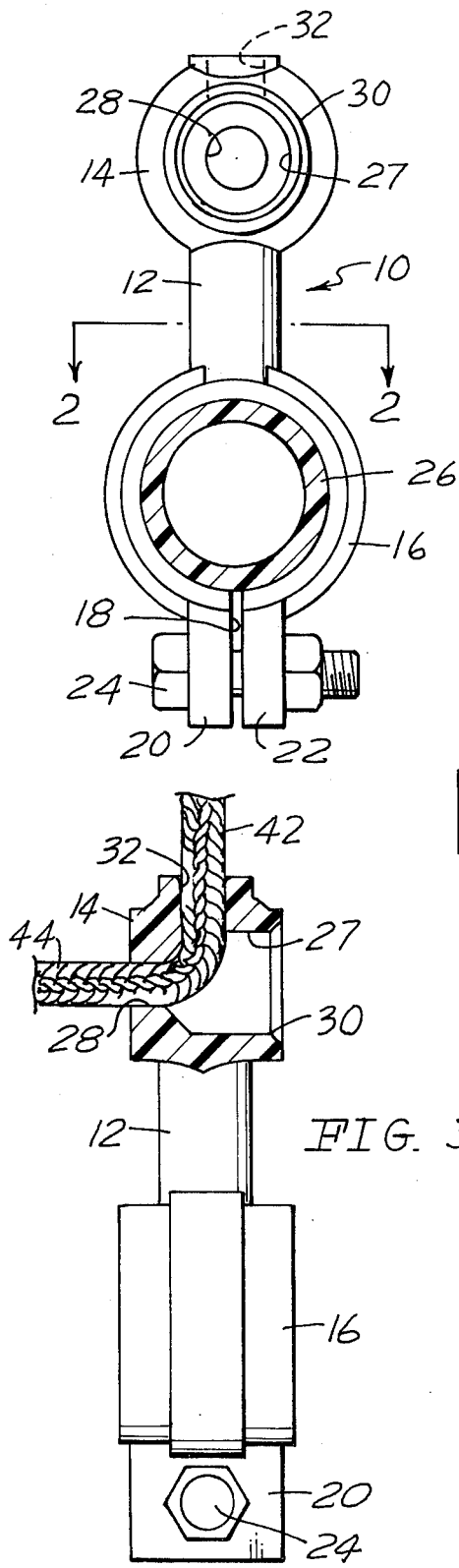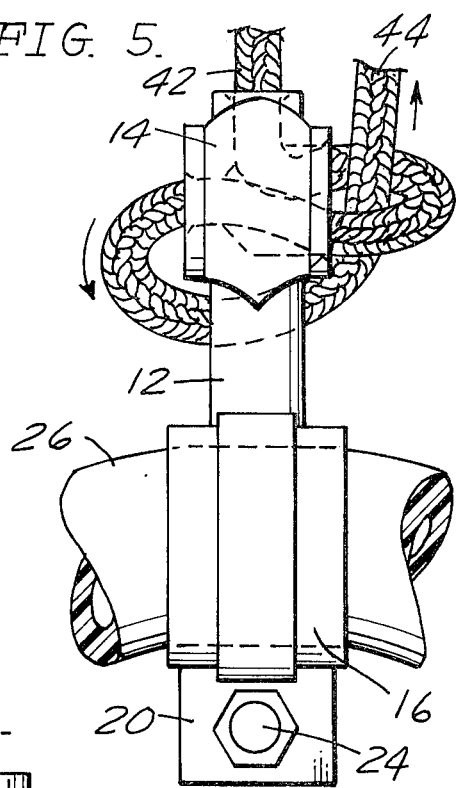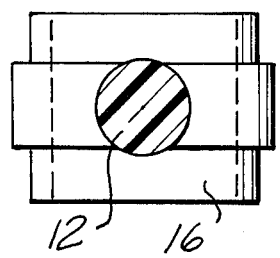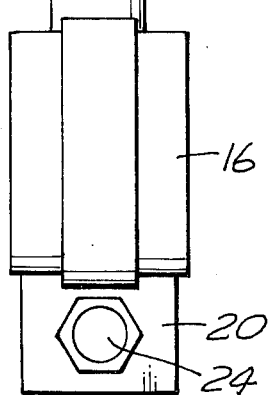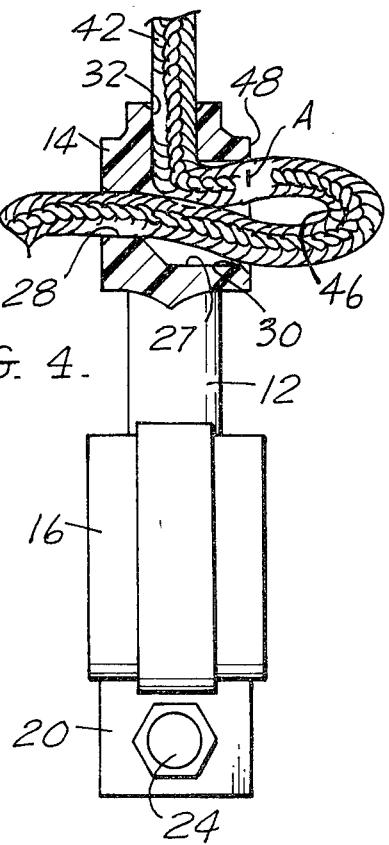

FLOAT TETHER TERMINATOR

BACKGROUND OF THE INVENTION

In recent years floating breakwater units have been developed, which utilize a series of tethered floats connected to a submerged ballast to diminish the force and size of waves generated in the water. The desirability of such a system is readily apparent when considering the protection for moored boats and ships as well as the creation of a temporary harbor or the control of beach and sand erosion. The general arrangement of such a breakwater unit consists of a large number of floats which are aligned in a series of rows and are connected through tether lines to a submerged ballast, which is anchored by cable to the bottom of the body of water. As waves hit or contact the first line of floats, the oscillation of the floats throughout the parallel lines causes a drag that absorbs energy from the waves and reduces their height.

The size of the floats as well as the ballast and the length of the tether lines are all dependent upon the partic ular locality and conditions of the water where the unit is to be placed. For instance, the size of the floats for use in a bay or harbor area may be 12 inches in diameter and the overall unit may have approximately 800 floats, with the rows being 150 feet in length. However, in an ocean system, the floats may be larger (5 to 7 feet in diameter) with the length of the units reaching 500 to 600 feet. Further, the length of the tether lines will also vary according to the height and frequency of the waves.

It is essential, however, that the tether line length for the unit be consistent throughout the floats in order to provide the uniform and most efficient operation in the absorption of wave energy to diminish the size and force of waves. The criticality of the length of the tether lines is of such importance that the tolerance is very small and the uniform length must be specifically maintained throughout the breakwater unit.

One of the major problems with respect to the overall design of the unit is the junction between the tether lines and the respective float and the ballast. It has been estimated by oceanographers that the number of waves a year that could wash over a float breakwater in a bay, for instance, would be 14,000,000. Consequently, the number of oscillations in pendulum motion between the floats and the ballast which is experienced by the junctions between the tether line and the floats and ballast is of a verny significant number, producing a great amount of fatigue and fiber abrasion on the tether line, typically resulting in the potential breakage of the line. The object of a good tether float breakwater unit is to be able to place it in locations where it can be left unmaintained to operate essentially maintenence-free over long periods of time. The fatigue and possible breakage of the tether lines through their typical knot or bolt-like attachments to the ballast and the floats pos a significant problem to the maintenance-free objective of the breakwater units.

Another advantage of the use of breakwater units relates to control of the effects of a storm, which can frequently generate 4-5 foot waves in a harbor where boats that are exposed to the main channel receive a tremendous beating and damage. The use of these breakwater units can also greatly increase the amount of shipping which can utilize a particular harbor area, as well as actually establishing a temporary harbor where none exists for loading and off-loading cargo. Furthermore, the military, especially the Navy, has an interest in such units, as they can provide a great advantage in aiding an assault landing.

SUMMARY OF THE INVENTION

The present invention is a terminator unit having a flexible central neck portion which acts as the pendulum pivot area for the relative motion between the floats and the ballast, reducing or substantially eliminating the fatigue which is normally exerted upon the tether line. The terminator has a head junction and a base junction connected or integrally formed on the respective ends of the center neck portion. The head junction is designed to receive one end of the tether line in a unique wrapping configuration through the head junction, so that the tether line is in axial alignment with the central neck portion so as to transfer tension of the tether line in a straight line to the central neck portion. The base junction of the terminator is designed to receive the float or, in the case of where the tether line is being connected to the ballast, it will attach to a portion of the ballast.

The design of the central neck portion will prvide and allow for maintenance-free use of the breakwater units by minimizing the line fiber abrasion and fatigue through reduction of the number of short radius bends that typically occur in a normal knot. The cylindrical neck portion serves as a living hinge, andhas a cross-sectional area such that the stress is low enough to produce the maximum creep tolerance, i.e., maximum extension during the lifetime of the system.

The bottom junction of the terminator may be a circular collar which fits around a tubular attachment eye that arches outwardly from the float, or it may be in the form of a threaded bolt which connects and ties directly to the ballast. In some instances, if the ballast is constructed of steel tubing, a circular collar may also be utilized for attachment to the ballast.

It should be noted that the present terminator is not limited to use solely with a breakwater unit, but may be utilized in numerous situations as a terminal connector member between a flexible line and another element. One such use, for example, is where a fisherman ties tethered floats to lobster and crab traps to make the location of the same.

Whenever there is concern over the fatigue and breakage of a flexible connection line which is subjected to some sort of oscillation or pivotal movement, the present terminator will provide a unique terminal connector with very little wear and fatigue on the line increasing its overall useful life.

BRIEF DESCRIPTION OF THE DRAWINGS:

FIG. 1 is a side elevational view of a terminator embodying the invention;

FIG. 2 is a sectional view of the same, taken along line 2—2 in FIG. 1;

FIG. 3 is an elevational view taken along one side of the terminator, with a partial section through the head portion showing the first step of attaching the tether line into the head portion;

FIG. 4 is a view similar to FIG. 3, showing the second step of attaching the tether line to the head portion;

FIG. 5 is a side elevational view of the terminator, showing the third step of attaching the tether line to the head portion;

DESCRIPTION OF THE PREFERRED EMBODIMENT

Figure 6:
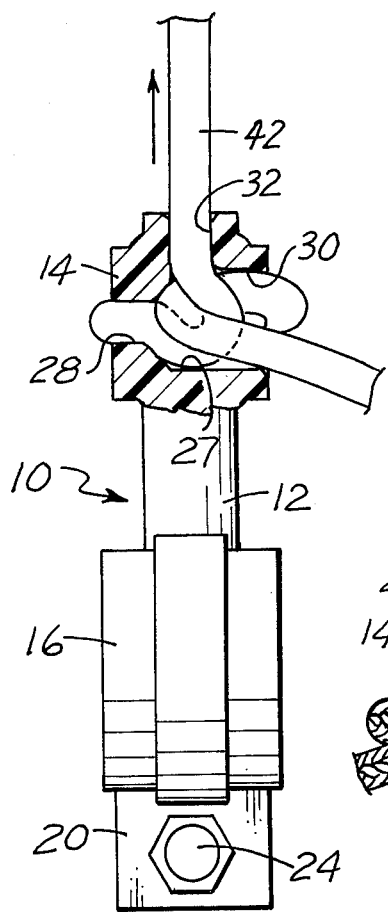
FIG. 6 is a partially cut away view of the terminator, showing the fourth step of securing the tether line to the head portion.

The terminator or connector 10 shown in FIG. 1 has a central neck portion 12 with a head portion 14 and a base portion 16 at its respective ends. As shown in FIG. 2, the central neck portion 12 has a generally cylindrical configuration, while the base portion 16 in FIG. 1 is a circular attachment collar having a transverse opening 18 with respective bolt-receiving flanges 20 and 22 to accommodate a tightening bolt 24 for securing the circular collar around the tubular member 26. As shown in FIGS. 1 and 3, the head portion 14 has a generally cylindrical configuration with an internal cavity 27 having two side apertures 28 and 30 which are in axial alignment with respect to one another. Aperture 28 is smaller than aperture 30. Opening through the top of the head portion 14 is a third aperture 32, which is located laterally of the apertures 28 and 30, and is axially aligned with the central neck portion 12.

Figure 8:
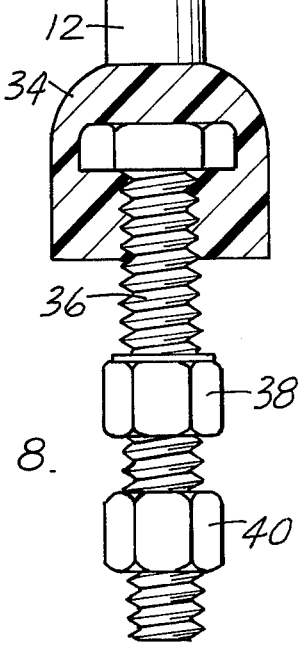
FIG. 8 shows an alternate embodiment of the terminator, having a bolt at the base portion.

An alternative embodiment of the terminator is shown in FIG. 8, where the base portion 34 has a threaded bolt 36 on which is located a tightening nut 38 and a lock nut 40. This threaded bolt embodiment is used for connection with a ballast frame made of angle irons, channels, or other structural steel members. Preferably, the bolt 36 is made of nylon, while the tightening nut 38 is also of nylon and the lock nut 40 is of PVC (polyvinyl chloride), so that when in the water the nylon nut will swell while the PVC nut will not, forming a locked system.

The terminators are preferably injection-molded, using ether- or polyester-bases polyurethane. However, other materials may be used or selected, which have high resistance to abrasion and the effects of exposure to marine environment. If the terminators have to be significantly large for deep water breakwater units, and have cylindrical central sections of up to 3 inches in diameter, the preferable method of production may be by compression-molding or casting, because of the long cycle time required to cool the part in the injection-molding process.

The method of connecting the tether line 42 to the head portion 14 of the terminator is illustrated in FIGS. 3-6, to which attention is now directed. The first step comprises the insertion of one end 44 of the tether line 42 through the top end aperture 32 into the cavity 27 and turning the tether line approximately 90° so as to exit through the head portion 14 via the small side aperture 28. The next step, shown in FIG. 4, comprises the pulling of the tether line down through the top aperture 32 and out through the enlarged side aperture 30 to form an exposed loop 46 adjacent the side aperture 30 outside of the head portion 14. As shown in FIG. 5, the end 44 of the tether line 42 is wrapped around the outside of the head portion 14, and inserted upwardly through the loop 46. The final step is shown in FIG. 6, where the tether line is pulled tightly in the direction of the arrow, causing the loop 46 to be drawn into cavity 27 of the head portion 14, and jamming the line back onto itself without the use of a typical knot. The tether line is consequently tightly secured to the head portion 14 and is axially aligned with the center of the central neck portion 12.

It will be noted in FIG. 4 that when the loop 46 is pulled through and formed outside the side aperture 30, a mark A on the tether line is aligned with the outside edge 48 of the head assembly adjacent the aperture 30. The purpose of this is to ensure that the length of the tether line between the terminator attached to the ballast and the terminator attached to the float is precisely the computed length for the average wave size and frequency for the particular body of water in which the breakwater is to be installed. It is critical in the design of large breakwater units that the distance between the ballast and the floats have a uniform predetermined distance, with little margin for error, in order to efficiently operate in absorbing the waves reaching the breakwater. Consequently, it is imperative that when forming and securing the tether line to the terminators, the length of the tether line must be exactly the computed length when it is pulled taut to the position shown in FIG. 6. To accomplish this, the tether line, before being attached to the terminators, is marked with two longitudinally spaced marks, of which only one (mark A) is shown in FIG. 4. This distance between the two marks is exactly equal to the computed length of tether line between the terminators plus a small known length of line that extends down into the cavity 27 of each of the terminators 10. Thus, all of the tether lines can be marked with the two marks A spaced exactly the same distance apart, and when the terminators 10 have been attached to the lines, the length of tether between the head portions 14 of the two terminators will be exactly the same for all assemblies, within very close tolerances.

Figure 9:
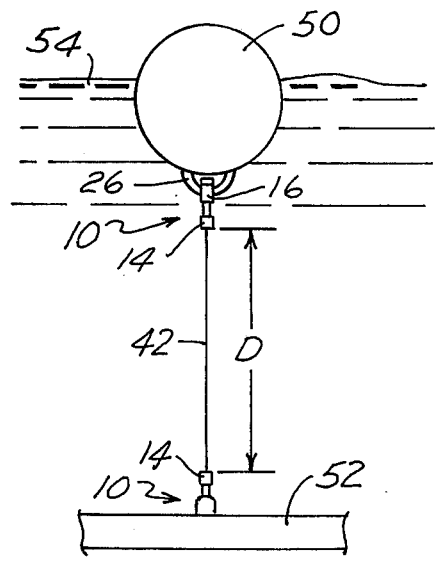
FIG. 9 is a schematic view of the terminator in use, showing a float connected to a submerged ballast.

FIG. 9 shows a schematic view of the float 50 and ballast 52, which is submerged below the waterline 54. The distnace D is critical with respect to each float in its attachment to the ballast to provide uniform distances throughout the overall breakwater assembly of several hundred floats. In many float designs, there is an attachment eye 26 on which the collar 16 of the terminator 10 can be attached. The tether line 42 extends down to the terminator 10 which is connected to the ballast 52. The ballast is usually a rectangular frame of steel beams or other structural members, which is anchored by cables (not shown) to the bottom, and is supported about 5 feet below the surface of the water by the buoyancy of the floats. The floats are typically arranged in eleven parallel rows, spaced 2 feet aprrt from one another, with the floats spaced about 2 feet apart along each row. The two outer rows of floats are only partially submerged, while the nine inner rows are completely submerged a few inches below the surface of the water.

Figure 7:
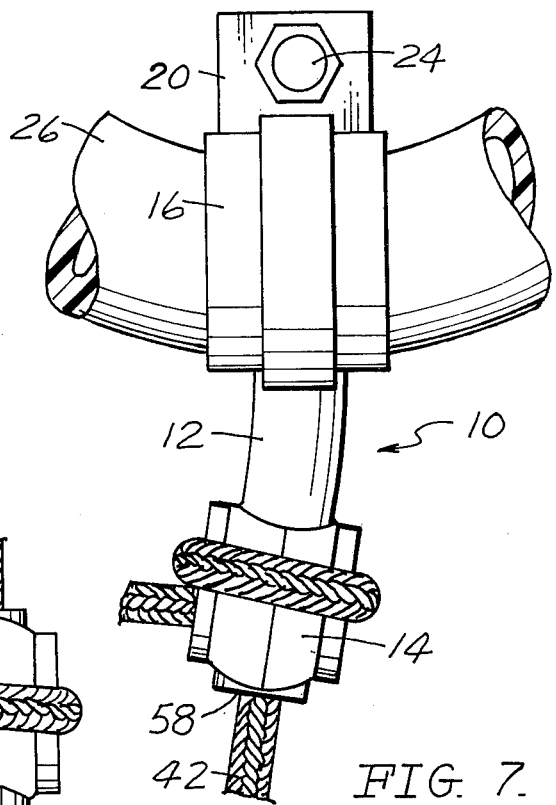
FIG. 7 is a view illustrating the flexion which occurs in the central neck portion.

As shown in FIG. 7, when there is wave motion through the breakwater unit, the relative movement between the float 50 and the submerged ballast 52 is generally oscillatory in nature, with a pendulum-type bending action through the central neck portion 12 of the terminator 10, while tension in the tether line due to buoyancy of the float is transmitted in a straight line from the top terminator to the bottom one, with no bending of the tether line at the point where it joins the terminators. It is the constant bending of the tether line under tension that causes abrasion and fatigue of the fibers, and by eliminating such bending, the present invention greatly in creases the service life of the tether line. Bending occurs entirely within the resilient central neck portion 12 or polyurethane elastomer, and does not occur at the junction 58 between the terminator head portion 14 and the tether line 42. The primary reason for this flexion of the central neck portion is the axial alignment between the tether line and the central neck portion, in conjunction with the unique attachment of the tether line to the head portion 14 of the terminator 10.

As stated previously, it is contemplated that the use of the present terminator is not limited to tethered breakwater units, but may be utilized for other terminal connections between a flexible line and a second element, where pivotal movment may cause possible fatigue and wear to the end of the line.

While I have shown and described in considerable detail what I believe to be the preferred embodiment of the invention, it will be understood by those skilled in the art that the invention is not limited by such details, but may take various other forms within the scope of the following claims.

What I claim is:

1. In a tethered float breakwater assembly for reducing wave motion in water comprising at least one float; a tether line respectively connected at one end to said float; and a submerged ballast connected to the other end of said tether line, the improvement comprising:

elastomeric means at each end of said tether line joining the same to said float and to said ballast, respectively, each of said means comprising an elongated, soft, pliable neck of substantially uniform cross section for most of its length, said neck having a head portion at one end thereof and a base portion at the other end;

said head portion having a configuration to receive one end of said tether line in a locking connection therewith; and said base portion having a formation to provide a mechanical connection to said ballast.

2. The method of securing one end of a line of a flexible terminal connector used to unite said line to another element, wherein said connector has a central neck portion with a head portion at one end having a cavity with a first and a second aperture in opposite sides thereof, said apertures being concentrical aligned with respect to one another, and perpendicular to the longitudinal axis of said neck portion, said cavity having a third aperture aligned with said longitudinal axis of said central neck portion, said method comprising the steps of:

a. inserting said one end of said line down through said third aperture into said cavity and out through said second aperture;

b. pulling the line within said cavity out through said first aperture, making an exposed loop of said line adjacent said first aperture;

c. wrapping said one end of said line around the outside of said head portion and inserting said end of said line through said exposed loop; and d. pulling on the line extending outwardly from said third aperture so as to cause said loop to be drawn into said cavity, thereby jamming the line tightly on itself within the cavity, and providing a straight-line exit of the line from said cavity through said third aperture coaxial with said central neck portion.

3. A terminal connector for joining one end of a flexible line to another member, said connector comprising;

an elongated body of elastomeric resin having a base formation at one end thereof that is adapted to be fixedly secured to said other member;

a head formation at the other end of said body that is adapted to receive said flexible line in a manner whereby the line is formed into a knot and is thereby secured to the connector; and a cylindrical neck portion extending between said base formation at said one end of the connector body and said head formation at said other end, said cylindrical neck portion being resilient and flexible, so that it can bend in all directions responsive to tension on the line;

said head formation being formed with an aperture opening from its outer end and extending coaxially with respect to the longitudinal axis of said neck portion, through which said line is passed; said aperture opening into a transverse bore that is larger in diameter on one side of said aperture opening than on the other side thereof, whereby a doubled portion of said line can be passed through the larger diameter portion to form a loop on the outside of the head formation through which the free end of the line is passed.

* * * * *